Oct. 4, 1966 R. R. KELLER 3,276,177
SANDWICH PANEL WITH ORNAMENTAL COLORING FEATURE
Filed Dec. 18, 1963 2 Sheets-Sheet 1

INVENTOR
Robert R. Keller

BY Frederick D. Goode
ATTORNEY

Oct. 4, 1966 R. R. KELLER 3,276,177
SANDWICH PANEL WITH ORNAMENTAL COLORING FEATURE
Filed Dec. 18, 1963 2 Sheets-Sheet 2
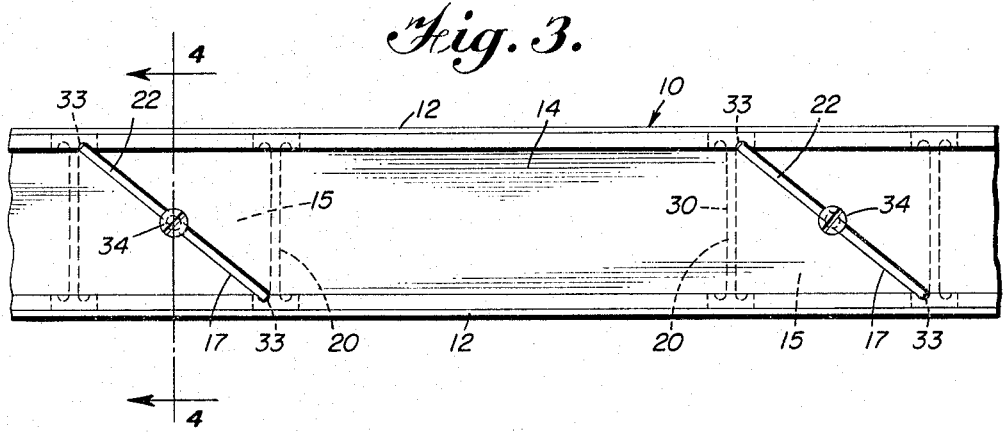
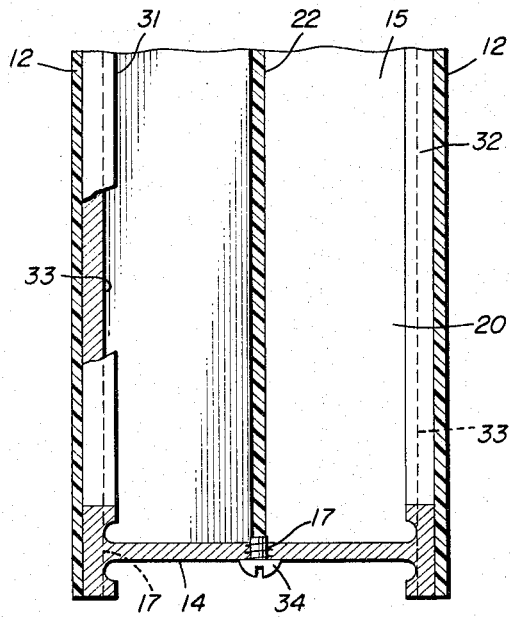 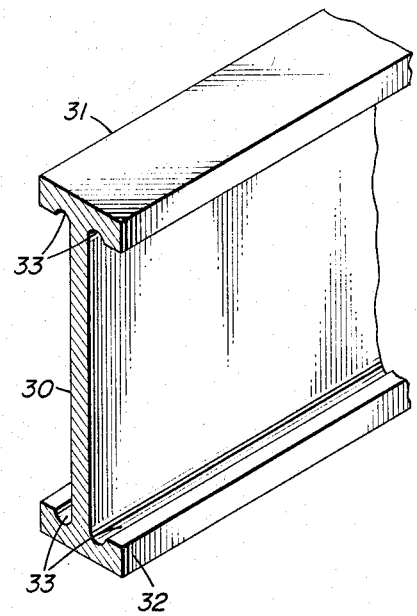
INVENTOR
Robert R. Keller
BY *Frederick D. Goode*
ATTORNEY

United States Patent Office 3,276,177
Patented Oct. 4, 1966

3,276,177
SANDWICH PANEL WITH ORNAMENTAL COLORING FEATURE
Robert R. Keller, 41 Union St., Manchester, N.H.
Filed Dec. 18, 1963, Ser. No. 331,513
5 Claims. (Cl. 52—311)

This invention generally relates to structural building panels and more particularly to improvements in light-diffusing panels in which light-transmitting sheet material is laminated to at least one side of a rigid, open core grid support or lattice work, the surface of which grid appears as opaque lines of configuration through the light-transmitting sheet material. The term "light-diffusing" panel as employed in this disclosure contemplates wall panel constructions employing translucent as well as transparent facing sheet material on at least one side of the associated grid core support, the other side of such grid carrying either a translucent, transparent or opaque facing sheet or conceivably no facing sheet material at all.

In the field of light-diffusing building wall panels, it has been the general practice to employ a construction generally comprised of providing a unitary open core gridwork, comprised of a multiplicity of structurally interconnected elements suitably joined to a peripheral frame and having a continuous sheet of translucent sheet material adhesively fastened to either or both sides thereof. Panels of this type are generally assembled and prefabricated at the factory and transported to the construction site for erection.

Although prior art panels manufactured with such a grid core have served their purpose, this type of panel fabrication, because of the singular integrity of the grid core has not proven entirely satisfactory from a manufacturing point of view for the reason that such construction requires considerable manual handling in the fastening together of the various grid core components and thereby does not readily lend itself to automated assembly techniques. As a result of these prior art methods of construction, the labor costs in producing these panels have been relatively high in comparison with other corresponding type buildnig materials.

The prior art structural light-diffusing wall panels of the type described also frequently contain colored insert material disposed interiorly within the light-transmitting facing sheets in order to achieve an aesthetically appealing colored design or to otherwise impart desired decorative or light-transmitting characteristics through the panel.

In the prior art methods of panel construction, however, these colored inserts become an integral part of the finished panel and must be incorporated therein at the time of manufacture in order to produce the desired effects. This method of selective color insertion possesses the disadvantage, however, that once these prior art panels are completed with the colored insert material disposed within their interior, it becomes permanently emplaced and replacing or changing such an insert in order to alter its aesthetic or light-transmitting effect is, as a practical matter, impossible.

Those connected with the development of light-diffusing building wall panels have long recognized the need for an improved panel construction which would simplify grid core construction and yet provide the desired versatility of selective internal color changes subsequent to manufacture thereof while retaining the structural qualities of the prior art form of panel construction. The present invention provides these features.

The following disclosure, in presenting the advantages of this invention over the prior art, envisions a panel incorporating a unique grid core construction comprised of a plurality of independent structural units, generally of a ladder-like nature, spaced laterally apart from one another and conjoined with continuous translucent sheet material laminated to each side thereof. Such freedom of selective lateral placement of these independent units comprising the grid core in itself, provides a constructional flexibility not heretofore realized, since it now becomes possible to fabricate panels of various widths on a production line basis merely by altering the relative disposition between these ladder-like units which comprise the grid assembly, before conjoining them with the continuous translucent sheet material.

It is therefore among the objects of this invention to provide a grid core construction for a structural building panel comprised of a plurality of independent, spaced apart unit components providing selective variations in panel width during manufacture thereof.

It is another object of this invention to provide a light-diffusing building wall panel incorporating new structural features which readily permit insertion and withdrawal of variously designed or colored insert material into and from the interior of the panel subsequent to the manufacture and completion thereof, thereby providing an aesthetic versatility not present with current panel construction and fabrication.

Still another object of this invention is to provide a commercial versatility by which a consumer may select whatever aesthetic design or color insert variation he may desire in a light-diffusing building panel at any time subsequent to manufacture and prior to installation thereof in an economical yet highly effective manner.

It is yet a further object to provide a suitable locking means for retaining a color insert in position within the interior panel structure without the need of complex retention mechanisms.

With these and other objects in view, as will hereinafter more fully appear, and which will be more particularly pointed out in the appended claims, reference is now made to the following description taken in connection with the accompanying drawings in which:

FIGURE 3 depicts a bottom view of FIGURE 1 taken on line 3—3 thereof;

FIGURE 4 shows a partial vertical cross sectional view taken on line 4—4 of FIGURE 3, and FIGURE 5 illustrates a partial perspective view of a typical structural element employed in the construction of the herein invention.

Figure 1:
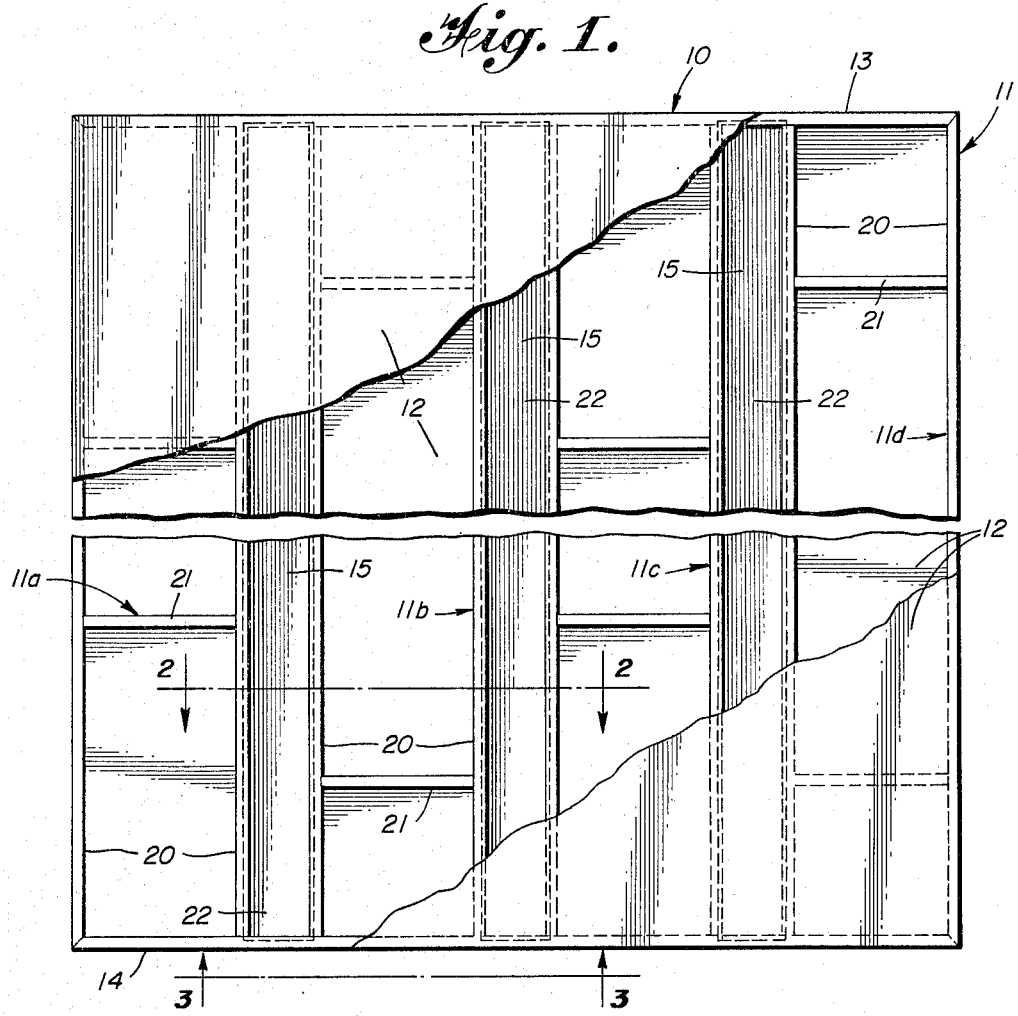
FIGURE 1 illustrates a partially cut away front elevation view of a typical building panel made in accordance with this invention.

Referring now to the drawings and more particularly to FIGURE 1, there is shown therein a typical panel 10 constructed in accordance with this invention and includes a grid core assembly 11 comprised of a plurality of unit components or structural ladder sections 11a, 11b, 11c, and 11d which may be inter-connected with each other at their top portions by a head section 13 and similarly interconnected at their bottom end portions by a sill section 14 as depicted in the illustrations. However, overlaying each side of this grid core assembly is a thin continuous light-transmitting facing sheet material 12. Each structural element comprising the ladder sections and head and sill sections consists of a relatively lightweight material of I-beam shape cross section, such as extruded aluminum, plastic or the like, having a cross sectional shape similar to that depicted in FIGURE 5. Referring to FIGURE 5, it may be seen that each of the I-beam shaped members is comprised of a web 30 of substantial width having opposed flange portions 31, 32 extending along each edge as an integral part thereof. At the intersection of the web with each flange portion is located a groove 33 which extends the entire length of each I-beam element.

Although the various I-beam shaped elements comprising the structural ladder-like components 11a, 11b, 11c and 11d may be inter-connected and fastened in any suitable manner which would render them substantially rigid and self supporting, I prefer to employ the inter-connection techniques disclosed in my U.S. Patent No. 2,931,468, issued April 5, 1960. This referenced method of fastening in building panel construction of this type has been found to be both effective and economical in mass production manufacturing.

As employed in this disclosure, a typical ladder-like section 11a, for example, consists of a vertical pair of parallel structural members 20 inter-connected at predetermined locations by horizontally disposed structural element 21. Accordingly, in the manufacture of the herein disclosed grid core assembly, it is now apparent that the only subassembly necessary is a ready supply of ladder-like sections, as for example 11a. This one form of subassembly can then be cut to any desired length, and plural numbers of these sections disposed in coplanar spaced apart relation can be employed to form the grid assembly.

In the fabrication of a typical grid core 11 in accordance with this disclosure, a series of ladder sections 11a, 11b, 11c and 11d are cut to desired length and positioned adjacent to one another in selected spaced apart relation, the over-all width of this assemblage corresponding to the desired width of the completed panel. Head section 13 and sill section 14 are then cut to a length which corresponds to the completed panel width and are suitably secured to the respective top and bottom end portions of each of the ladder sections 11a, 11b, 11c and 11d thereby inter-connecting each of these sections, providing a substantially rigid self-suporting grid core with a plurality of unobstructed channels, or chamber portions, or passageways 15. Should a grid core of greater or lesser width be required, this could be accomplished by adding or removing various ladder sections or alternatively, a given number of such ladder sections may be spaced apart from one another a greater or lesser distance, depending on the panel width desired with head and sill sections 13 and 14 respectively being correspondingly cut to size.

Figure 2:
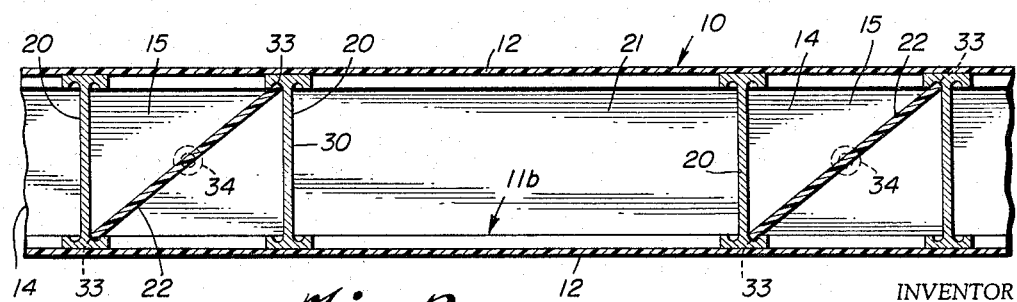
FIGURE 2 shows a fragmentary horizontal cross sectional view of FIGURE 1 taken on line 2—2 thereof.

Having thus formed the rigid core assembly, we now refer to FIGURE 2 illustrating a fragmentary horizontal section taken on line 2—2 of FIGURE 1. There is shown in this illustration a series of light-transmitting strips 22 extending diagonally across passageways 15 and extending the full length thereof, from head section 13 to sill section 14. In the preferred embodiment, these strips 22 are removably inserted into channels 15 by means of slots 17 (FIGURE 3) which are cut through sill 14 so as to communicate with the aforesaid channels 15. Slots 17 are so cut that the ends thereof terminate within and preferably conform to grooves 33 of the structural elements 20.

Translucent facing sheet 12 of polyester fiber glass or other suitable material is laminated to each side of grid core 11 in a manner well known in the prior art, and suitably trimmed in size to conform with the outer peripheral edges of the grid core, thereby completing the panel 10. Though the preferred embodiment employs translucent facing sheet material on both sides of the grid core, it is to be understood that the panel may be so constructed that only one side has a light-transmitting facing sheet, the other side carrying a facing sheet of opaque material. In a construction of this latter type, the panel when viewed from the side carrying the light-transmitting facing sheet renders an appearance of depth and discernible color effect due to the presence of color insert material 22. Having thus constructed a basic translucent panel, it is now possible to introduce color variations to the interior of the panel by means of the aforesaid slots 17 as follows:

Colored polyester glass fiber light-transmitting strips or inserts 22 of length corresponding to the height of passageway 15, and having a width corresponding to the length of slots 17, are inserted into each passageway in such a manner that the edges of strips 22 engage the diagonally opposed grooves 33. By virtue of having their edges confined within grooves 33, inserts 22 are therefore prevented from any lateral or rotational movement and are therefore able to slide in a vertical direction only. A self-tapping screw 34 is threadedly engaged into each slot 17 following insertion of strip 22, thereby acting as a positive stop to prevent strips 22 from falling out of the slot when the panel is erected into its vertical position. Though I illustrate only one form of retention means, it is, of course, to be understood that any other form of conventional fastener may be satisfactorily employed. By locating slots 17 in the bottom edge of the panel rather than the top edge, the possibility of moisture seepage into the panel interior is thereby for all practical purposes eliminated.

It is therefore now apparent that in its erected position, the light-diffusing panel will appear multi-colored, with portions thereof having the color of the light-transmitting sheet material 12 separated by alternate continuous bands of different colors due to the color influence of the insert material 22. These inserts may also have variously shaped designs cut out in them which are visible when viewed through the light-transmitting facing sheet, thereby adding to the aesthetic appeal of the panel. Though the preferred embodiment discloses a grid core assembly incorporating inter-connecting means 13 and 14, it is to be understood that this disclosure is intended to encompass a wall panel construction whereby the plural ladder-sections are structurally conjoined by the facing sheet material only, thereby dispensing with the need for elements 13 and 14. In such a construction the panel edges may then be completed in the manner disclosed by my co-pending application Serial No. 325,680, filed November 22, 1963.

It will be understood that various changes in the details, materials, steps and arrangements of parts which have been herein described and illustrated in order to explain the nature of the invention, may be made by those skilled in the art within the principles and scope of the invention as expressed in the appended claims.

Having thus described my invention, I claim:

1. A structural panel comprising a plurality of independent ladder-like grid core sections disposed in coplanar relation and spaced apart from one another whereby to form unobstructed passageways therebetween, each of said independent sections being comprised of a parallel pair of rigid vertically disposed I-beam elements inter-connected at predetermined intervals with similarly shaped horizontal I-beam elements, a first rigid I-beam element inter-connecting only the top portions of said plurality of independent sections, and a second I-beam element inter-connecting only the bottom end portions of said independent sections, each of said I-beam elements being comprised of a web portion of substantial width and extending the entire length of said element and a pair of flange portions along opposite edges of said flange portion and co-extensive with the length thereof, a longitudinal recessed groove at the intersections of said flange and web portions, and a plurality of elongated apertures in the said second I-beam element communicating with each corresponding unobstructed passageway.

2. A sandwich type building wall panel comprising a plurality of elongated structural units in spaced apart coplanar relation forming unobstructed chambers therebetween, top and bottom structural elements inter-connecting the respective end portions of said units, continuous sheet material bonded to each of the coplanar sides of said spaced apart units, an elongated aperture through the bottom structural element communicating with each of the aforementioned unobstructed chambers, and colored translucent material inserted through said aperture into the aforesaid unobstructed chamber.

3. A building wall panel comprising a plurality of elongated structural units in spaced apart coplanar relation with each other and inter-connected only along their respective end portons, chamber portions formed between adjacent ones of said structural units, continuous light-transmitting sheet material bonded to each of the coplanar sides thereof, means for access into each of the aforesaid chamber portions, and colored light-transmitting insert material selectively inserted into the said chambers through said means.

4. In translucent sandwich type building wall panels comprised of a structural core carrying translucent sheet material on its opposed surfaces thereof, the improvement comprising a grid core fabricated of a plurality of reticulated, independently spaced apart units disposed in coplanar relation with one another, a first and second structural member inter-connecting the end portions of said units, whereby the spaces between said spaced apart units forms unobstructed channels therebetween, continuous light-transmitting sheet material bonded to each of the coplanar sides thereof, and decorative light-transmitting means insertable into said unobstructed channels through the end portions of said panel.

5. A building wall panel comprising a plurality of independent structural units in spaced apart parallel coplanar relation, light-transmitting sheet material bonded to at least one coplanar side conjoining said plurality of structural units and forming unobstructed chambers between adjacent ones of said units, and colored light-transmitting insert material selectively inserted into said chambers.

References Cited by the Examiner

UNITED STATES PATENTS

| | | | |
|---|---|---|---|
| 2,542,581 | 2/1951 | Schreffler | 52—311 X |
| 2,931,468 | 4/1960 | Keller | 52—481 X |
| 2,981,382 | 4/1961 | Keller | 52—311 X |
| 3,024,880 | 3/1962 | Burmeister | 52—311 |

FRANK L. ABBOTT, *Primary Examiner.*

R. S. VERMIT, *Assistant Examiner.*